(12) United States Patent
Maeno et al.

(10) Patent No.: US 11,869,717 B2
(45) Date of Patent: Jan. 9, 2024

(54) CAPACITOR

(71) Applicant: Panasonic Intellectual Property Management Co., Ltd., Osaka (JP)

(72) Inventors: Fumikazu Maeno, Toyama (JP); Toshihisa Miura, Aichi (JP); Eriko Kanatani, Toyama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 616 days.

(21) Appl. No.: 17/080,923

(22) Filed: Oct. 27, 2020

(65) Prior Publication Data

US 2021/0043377 A1 Feb. 11, 2021

Related U.S. Application Data

(63) Continuation of application No. PCT/JP2019/015583, filed on Apr. 10, 2019.

(30) Foreign Application Priority Data

May 25, 2018 (JP) .................................. 2018-100913

(51) Int. Cl.
*H01G 2/10* (2006.01)
(52) U.S. Cl.
CPC ..................................... *H01G 2/10* (2013.01)
(58) Field of Classification Search
CPC .................................. H01G 2/06; H01G 2/106
See application file for complete search history.

(56) References Cited

U.S. PATENT DOCUMENTS

| | | | | |
|---|---|---|---|---|
| 4,667,267 A | * | 5/1987 | Hernandez | H01G 4/228 361/306.2 |
| 2014/0285969 A1 | | 9/2014 | Kojima et al. | |
| 2017/0352495 A1 | * | 12/2017 | Sato | H05K 5/0026 |

FOREIGN PATENT DOCUMENTS

| | | |
|---|---|---|
| CN | 104064351 A | 9/2014 |
| JP | 2006-049556 | 2/2006 |
| JP | 2009-259932 | 11/2009 |
| JP | 2014-207427 | 10/2014 |

OTHER PUBLICATIONS

International Search Report of PCT application No. PCT/JP2019/015583 dated Jun. 25, 2019.
English Translation of Chinese Office Action dated Oct. 29, 2021 for the related Chinese Patent Application No. 201980032793.6.

* cited by examiner

*Primary Examiner* — Hung V Ngo
(74) *Attorney, Agent, or Firm* — Rimon P.C.

(57) ABSTRACT

A capacitor includes a capacitor element, a case housing the capacitor element, a filling resin filled in the case, and a board holder including a fixing part to which a circuit board mounted with an electronic circuit is to be fixed. The board holder is configured to hold the circuit board to be exposed from the filling resin.

8 Claims, 10 Drawing Sheets

CAPACITOR

RELATED APPLICATIONS

This application is a continuation of the PCT International Application No. PCT/JP2019/015583 filed on Apr. 10, 2019, which claims the benefit of foreign priority of Japanese patent application No. 2018-100913 filed on May 25, 2018, the contents all of which are incorporated herein by reference.

BACKGROUND

1. Technical Field

The present disclosure relates to a capacitor.

2. Description of the Related Art

Conventionally, a case-mold-type capacitor is well known. The case-mold-type capacitor includes a capacitor element, an electrode terminal, a double-sided substrate, an external terminal, and a mold resin. The capacitor element includes electrodes respectively at its both end faces. The electrode terminal is connected to each of the electrodes at one end of the electrode terminal. The double-sided substrate includes a conductive part connected to the other end of the electrode terminal. The external terminal has its one end connected to the double-sided substrate so as to be electrically connected to the electrode terminal via the conductive part. The mold resin is filled in a case (see, for example, Unexamined Japanese Patent Publication No. 2009-259932). The double-sided substrate is embedded in the mold resin, and the external terminal is exposed from the mold resin.

SUMMARY

A capacitor according to an aspect of the present disclosure includes a capacitor element, a case housing the capacitor element, a filling resin filled in the case, and a board holder including a fixing part to which a circuit board mounted with an electronic circuit is to be fixed. The board holder is configured to hold the circuit board to be exposed from the filling resin.

The present disclosure provides a capacitor including a circuit board from which heat is sufficiently dissipated.

Effects or meanings of the present disclosure are further clarified in the description of an exemplary embodiment below. However, it is to be understood that the exemplary embodiment described below is to be considered in all aspects as merely an example of implementing the present disclosure, and thus, the present disclosure is not limited to the exemplary embodiment below.

DETAILED DESCRIPTION OF EMBODIMENT

Figure 1A:
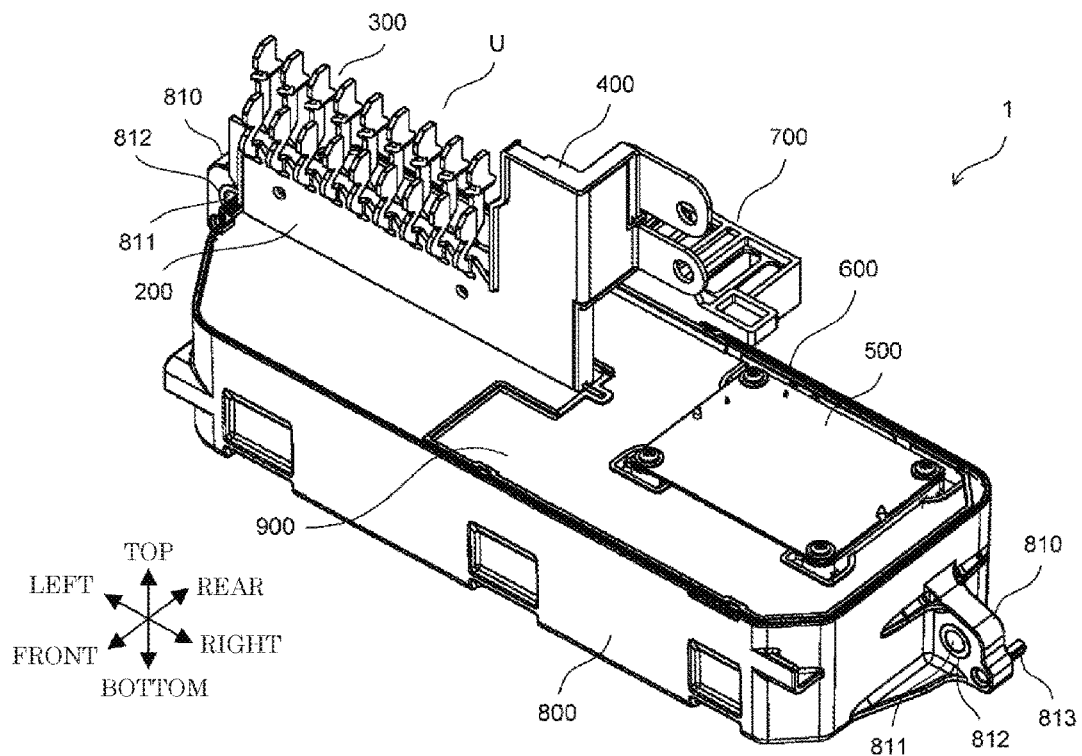
FIG. 1A is a perspective view illustrating a film capacitor according to an exemplary embodiment.

A capacitor disclosed in Unexamined Japanese Patent Publication No. 2009-259932 includes a double-sided substrate merely provided with a conductive part. The double-sided substrate does not have an electronic circuit mounted thereto.

A case-mold-type capacitor may include an electronic circuit related to a capacitor element, for example, a circuit board to which a discharge circuit has been mounted, and the discharge circuit is configured to discharge a residual electrical charge from the capacitor element. In this case, when the circuit board is embedded in the mold resin as described above, heat generated in components of the electronic circuit is less likely to be dissipated outside, thereby causing a defect in the electronic circuit or the capacitor element.

In view of respects described above, the present disclosure provides a capacitor including a circuit board from which heat is sufficiently dissipated.

Film capacitor 1 according to an exemplary embodiment of the present disclosure will be described with reference to the drawings. For the sake of convenience, a front-to-rear direction, a left-to-right direction, and a top-to-bottom direction are additionally described in the drawings as appropriate. Note that, each of these directions is not an absolute direction but a relative direction with regard to an orientation of film capacitor 1.

In this exemplary embodiment, film capacitor 1 corresponds to a "capacitor" disclosed in the appended claims, and each of first end-face electrode 110 and second end-face electrode 120 corresponds to an "electrode" disclosed in the appended claims. Further, each of first bus bar 200 and second bus bar 300 corresponds to a "bus bar" disclosed in the appended claims, and discharge circuit 510 corresponds to an "electronic circuit" disclosed in the appended claims. Further, board holder 600 corresponds to a "board holder" disclosed in the appended claims, and fixing boss 620 corresponds to a "fixing part" disclosed in the appended claims. Further, each of first signal bus bar 670 and second signal bus bar 680 corresponds to "electrical wiring" disclosed in the appended claims.

However, the description above is only intended to define correspondences between components in the appended claims and components in the exemplary embodiment. Each of the correspondences described above does not limit the scope of the claims to the configuration described in the exemplary embodiment.

Figure 1B:
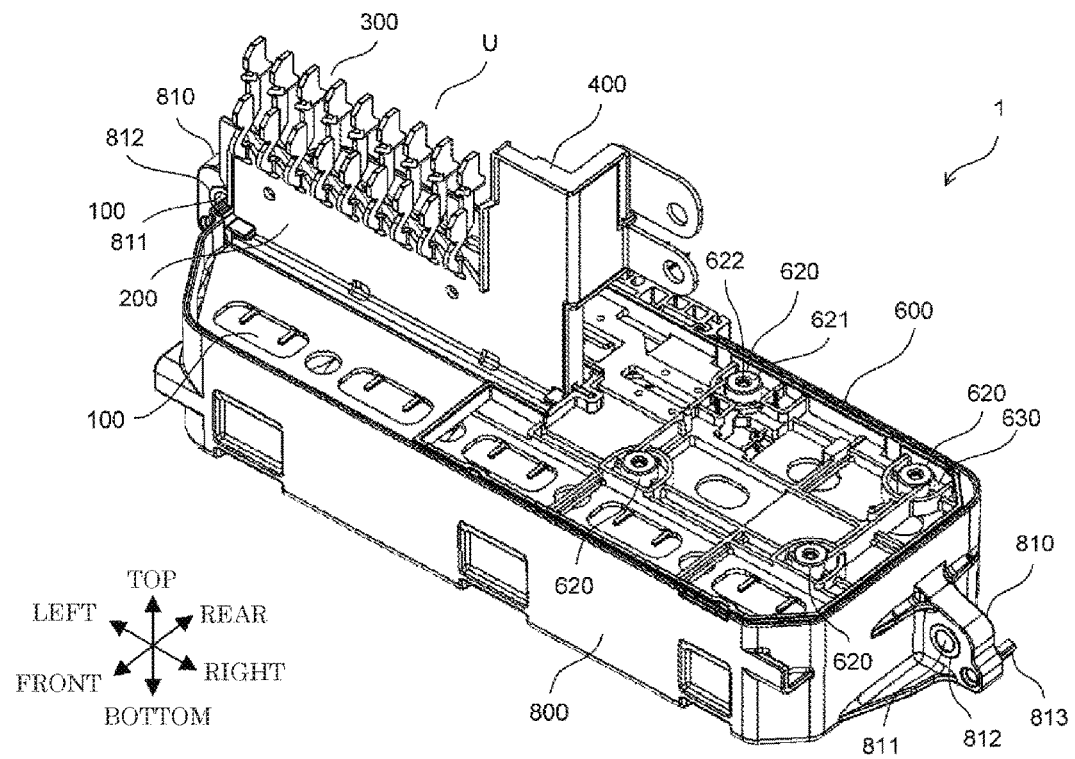
FIG. 1B is a perspective view illustrating the film capacitor according to the exemplary embodiment in a state where a capacitor element unit to which a board holder has been mounted is housed in a case.

FIG. 1A is a perspective view illustrating film capacitor 1, and FIG. 1B is a perspective view illustrating film capacitor 1 in a state where capacitor element unit U on which board holder 600 is mounted is housed in case 800.

Film capacitor 1 includes five capacitor elements 100, first bus bar 200, second bus bar 300, insulating plate 400, circuit board 500, board holder 600, terminal cover 700, case 800, and filling resin 900. Capacitor element unit U includes five capacitor elements 100, first bus bar 200, second bus bar 300, and insulating plate 400.

Figure 2A:
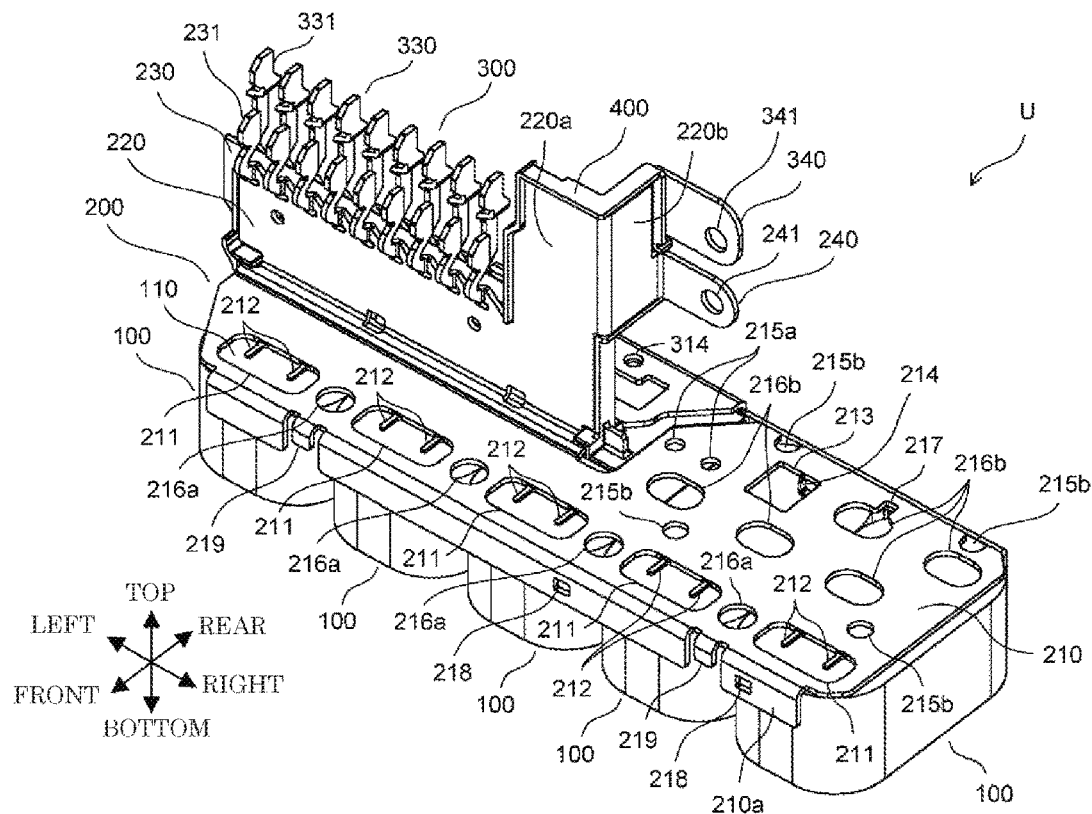
FIG. 2A is a front perspective view illustrating the capacitor element unit according to the exemplary embodiment.
Figure 2B:
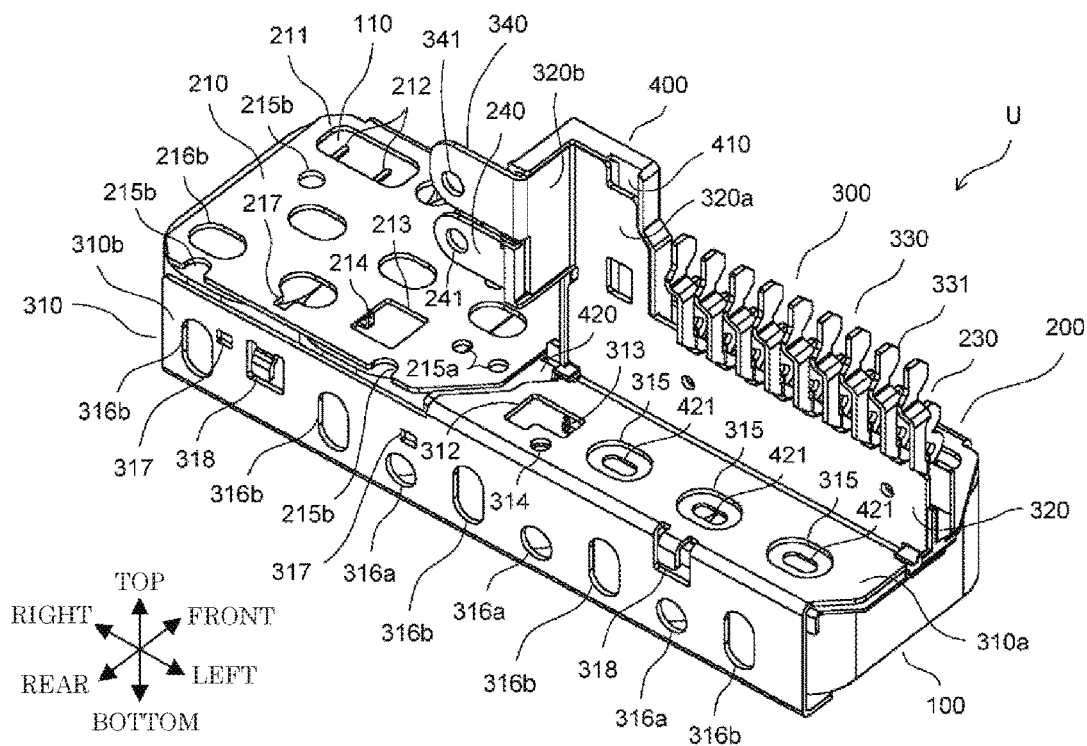
FIG. 2B is a rear perspective view illustrating the capacitor element unit according to the exemplary embodiment.
Figure 3:
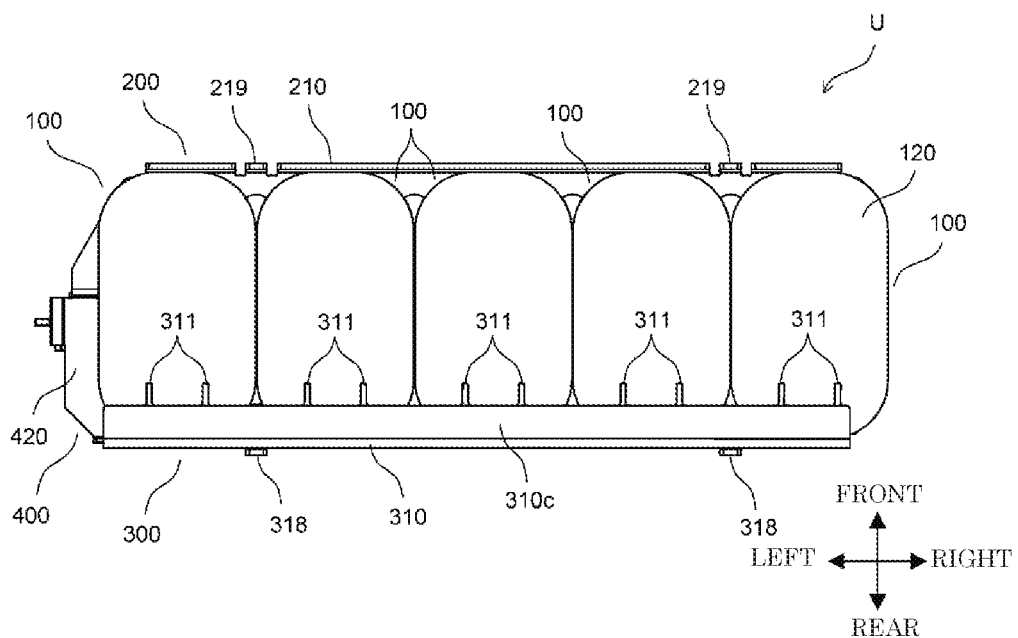
FIG. 3 is a bottom view illustrating the capacitor element unit according to the exemplary embodiment.

FIG. 2A is a front perspective view illustrating capacitor element unit U, and FIG. 2B is a rear perspective view ilustrating capacitor element unit U. FIG. 3 is a bottom view of capacitor element unit U.

Each of capacitor elements 100 is formed by stacking two metalized films in each of which aluminum is deposited on a dielectric film, winding or laminating the two metalized films stacked, and pressing the two metalized films stacked and wound or laminated into a flat shape. Each of capacitor elements 100 has, on its one end face, first end-face electrode 110 formed by spraying metal such as zinc, and on its other end face, second end-face electrode 120 formed similarly by spraying metal such as zinc. Five capacitor elements 100 are arrayed in the left-to-right direction such that both end faces of each of capacitor elements 100 face in the top-to-down direction.

First bus bar 200 is a conductive material, and is formed by, for example, appropriately cutting out and bending a copper plate. In first bus bar 200, first main body 210, first relay terminal 220, first connection terminal group 230, and first connection terminal 240 are integrally formed.

First main body 210 covers a substantially half area of first end-face electrode 110 in each of three of capacitor elements 100 that are disposed at a left side, and covers a substantially entire area of first end-face electrode 110 in each of two of capacitor elements 100 that are disposed at a right side. First main body 210 includes opening 211 of a substantially rectangular shape at a position corresponding to each of first end-face electrodes 110. Each of openings 211 has a substantially rectangular shape and includes, at its edge, a pair of first electrode terminals 212. The pair of first electrode terminals 212 are joined to each of first end-face electrodes 110 by a joining method such as soldering. As a result, first bus bar 200 is electrically connected to first end-face electrodes 110. Concurrently, first main body 210 includes opening 213 and first connection pin 214. Opening 213 has a substantially square shape and has, at its edge, first connection pin 214 of a hook shape. First main body 210 further includes two small fitting holes 215a of a circular shape, four large fitting holes 215b of a circular shape, four flow holes 216a of a circular shape, and four flow holes 216b of an oval shape. First main body 210 also includes engagement hole 217 to be connected to flow hole 216a at right of opening 213.

First main body 210 has front end portion 210a slightly extending downward and covering a part of circumferential face of each of five capacitor elements 100. Front end portion 210a includes, at its right side, two engagement holes 218. Front end portion 210a includes, at each of its left and right ends, a discontinuous space, and positioning piece 219 of a hook shape is formed in the discontinuous space. Each of positioning pieces 219 is used for positioning capacitor element unit U with respect to case 800 when capacitor element unit U is housed in case 800.

First relay terminal 220 rises upward from a rear end of a half left of first main body 210. At an upper end of first relay terminal 220, first connection terminal group 230 is provided. First relay terminal 220 includes upward extension portion 220a and rearward extension portion 220b. Upward extension portion 220a extends further upward from an upper right end of first relay terminal 220 where first connection terminal group 230 is not provided. Rearward extension portion 220b extends rearward from upward extension portion 220a, and at a rear end of rearward extension portion 220b, first connection terminal 240 is provided.

First connection terminal group 230 includes nine terminals 231 arranged and aligned in the left-to-right direction. First connection terminal 240 includes attachment hole 241 of a circular shape.

Second bus bar 300 is a conductive material, and is formed by, for example, appropriately cutting out and bending a copper plate. In second bus bar 300, second main body 310, second relay terminal 320, second connection terminal group 330, and second connection terminal 340 are integrally formed.

Second main body 310 includes upper face 310a, rear face 310b, and bottom face 310c. Upper face 310a covers a substantially half area of first end-face electrode 110 in each of three of capacitor elements 100 that are disposed at the left side. Rear face 310b covers the circumferential face of each of five capacitor elements 100. Bottom face 310c covers a part of second end-face electrode 120 included in each of five capacitor elements 100. Bottom face 310c includes, at its front end, a pair of second electrode terminals 311 at positions corresponding to each of second end-face electrodes 120. The pair of second electrode terminals 311 are joined to each of second end-face electrodes 120 by a joining method such as soldering. As a result, second bus bar 300 is electrically connected to second end-face electrodes 120. Upper face 310a includes opening 312 and second connection pin 313. Opening 312 has a substantially L shape and has, at its edge, second connection pin 313 of a hook shape. Concurrently, upper face 310a includes small fitting hole 314 of circular shape and three flow holes 315 of oval shape. Rear face 310b includes three flow holes 316a of a circular shape and five flow holes 316b of an oval shape. Rear face 310b also includes, at its right side, two engagement holes 317. Rear face 310b further includes two positioning pieces 318. Each of two positioning pieces 318 is used for positioning capacitor element unit U with respect to case 800 when capacitor element unit U is housed in case 800.

Second relay terminal 320 rises upward from a front end of upper face 310a of second main body 310. At an upper end of second relay terminal 320, second connection terminal group 330 is provided. Second relay terminal 320 includes upward extension portion 320a and rearward extension portion 320b. Upward extension portion 320a extends further upward from an upper right end of second relay terminal 320 where second connection terminal group 330 is not provided. Rearward extension portion 320b extends rearward from upward extension portion 320a, and at a rear end of rearward extension portion 320b, second connection terminal 340 is provided.

Second connection terminal group 330 includes nine terminals 331 arranged and aligned in the left-to-right direction. Second connection terminal 340 includes attachment hole 341 of a circular shape.

Insulating plate 400 is made of resin such as polyphenylene sulfide (PPS), and has an insulating property. Insulating plate 400 includes first insulating portion 410 and second insulating portion 420. First insulating portion 410 is disposed between first relay terminal 220 of first bus bar 200 and second relay terminal 320 of second bus bar 300. Second insulating portion 420 is disposed between upper face 310a of second main body 310 of second bus bar 300 and first end-face electrodes 110 included in three of capacitor elements 100 at the left side. Second insulating portion 420 includes three flow holes 421 of an oval shape to be aigned with three flow holes 315 of upper face 310a. First relay terminal 220 of first bus bar 200 and second relay terminal 320 of second bus bar 300 are arranged in layers in the front-to-rear direction with first insulating portion 410 interposed therebetween. With this configuration, an equivalent series inductance (ESL) in each of first bus bar 200 and second bus bar 300 is reduced.

Figure 4:
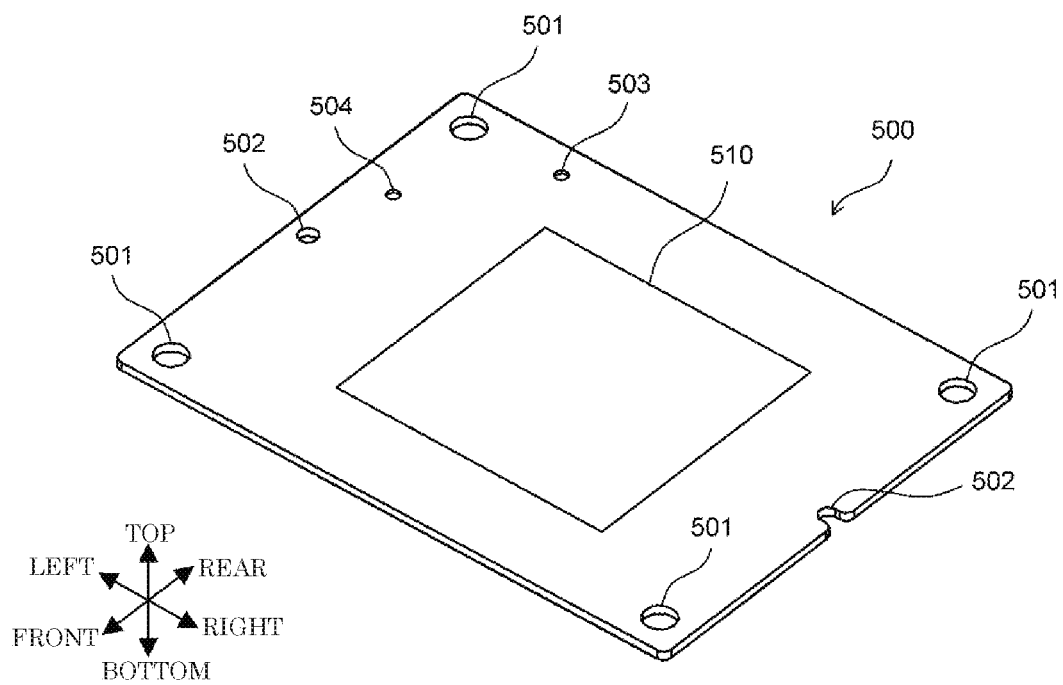
FIG. 4 is a perspective view illustrating a circuit board according to the exemplary embodiment.

FIG. 4 is a perspective view illustrating circuit board 500.

Circuit board 500 is a printed substrate of rectangular shape. Circuit board 500 has discharge circuit 510 mounted thereon, and discharge circuit 510 includes discharge resistors (not illustrated) connected in series or in parallel. Circuit board 500 includes, at its four corners, four attachment holes 501 of a circular shape. Concurrently, circuit board 500 includes positioning hole 502 of a circular shape at each of a center of left end and a center of right end of circuit board 500. Positioning hole 502 at the center of right end is open rightward. Circuit board 500 further includes first through hole 503 and second through hole 504, each of which is electrically connected to discharge circuit 510, in a vicinity of a left rear corner.

Figure 5A:
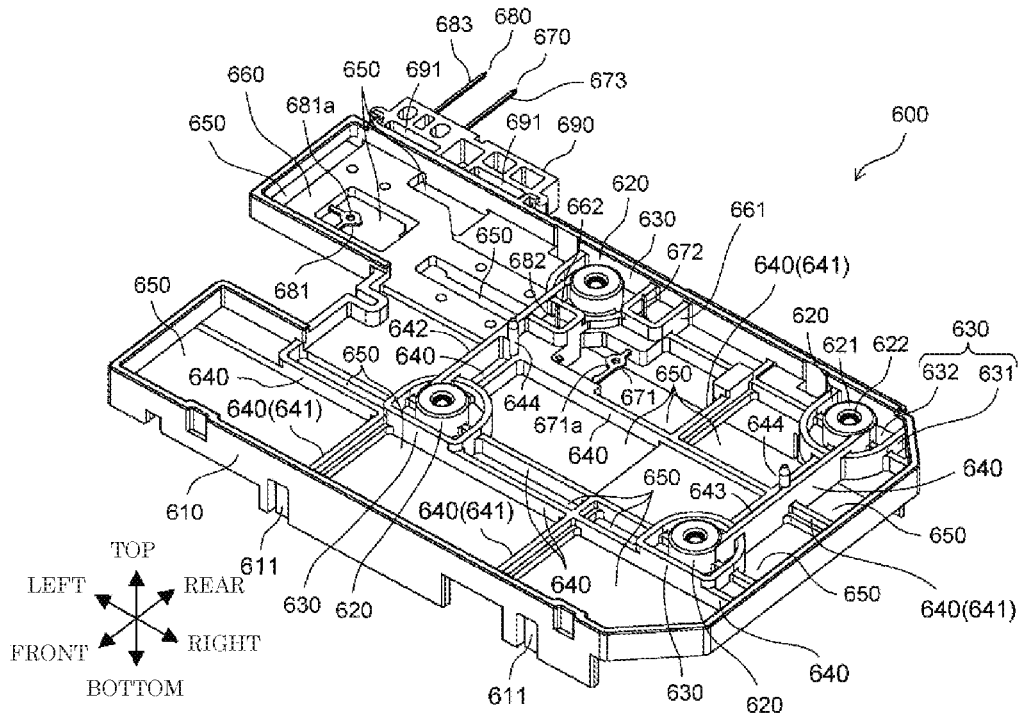
FIG. 5A is a front perspective view illustrating the board holder according to the exemplary embodiment.
Figure 5B:
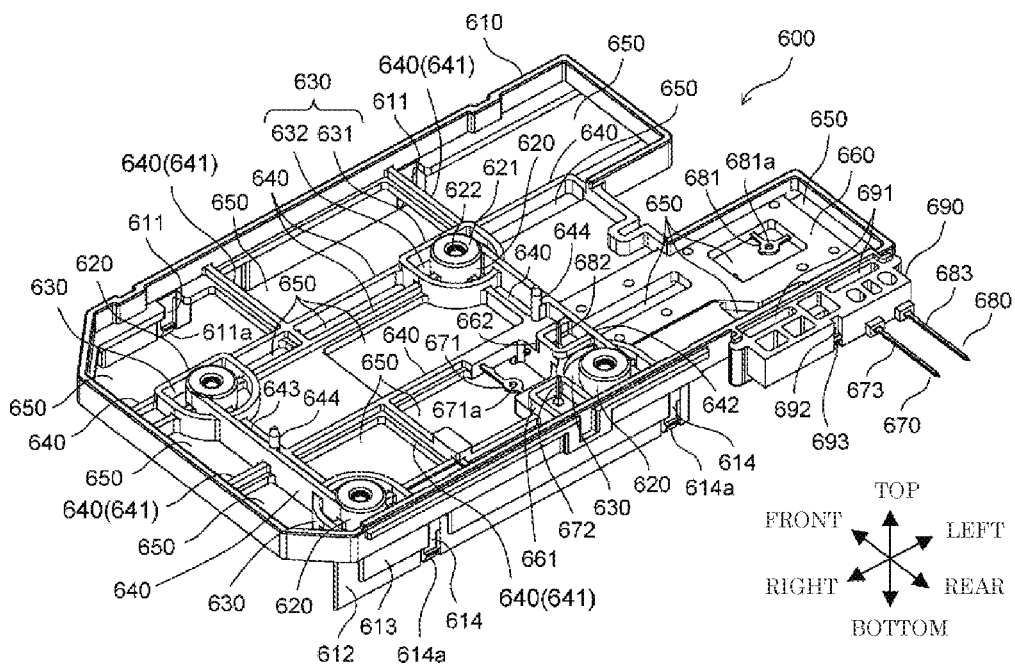
FIG. 5B is a rear perspective view illustrating the board holder according to the exemplary embodiment.
Figure 6A:
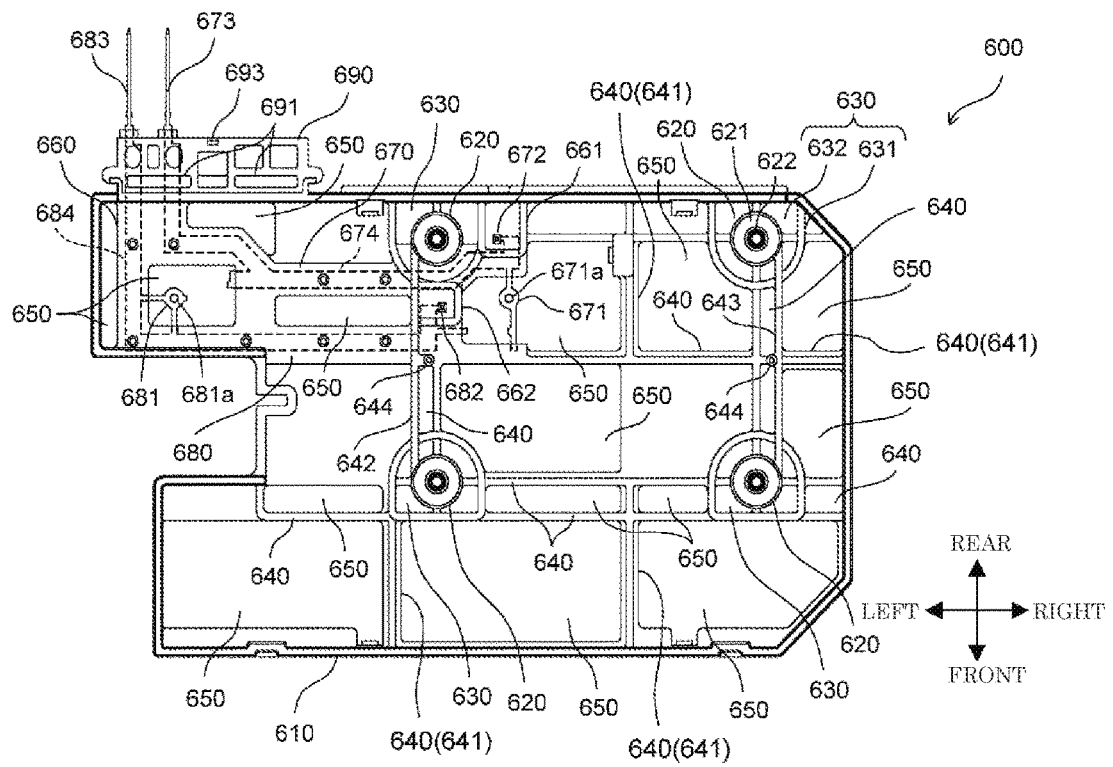
FIG. 6A is a plan view illustrating the board holder according to the exemplary embodiment.
Figure 6B:
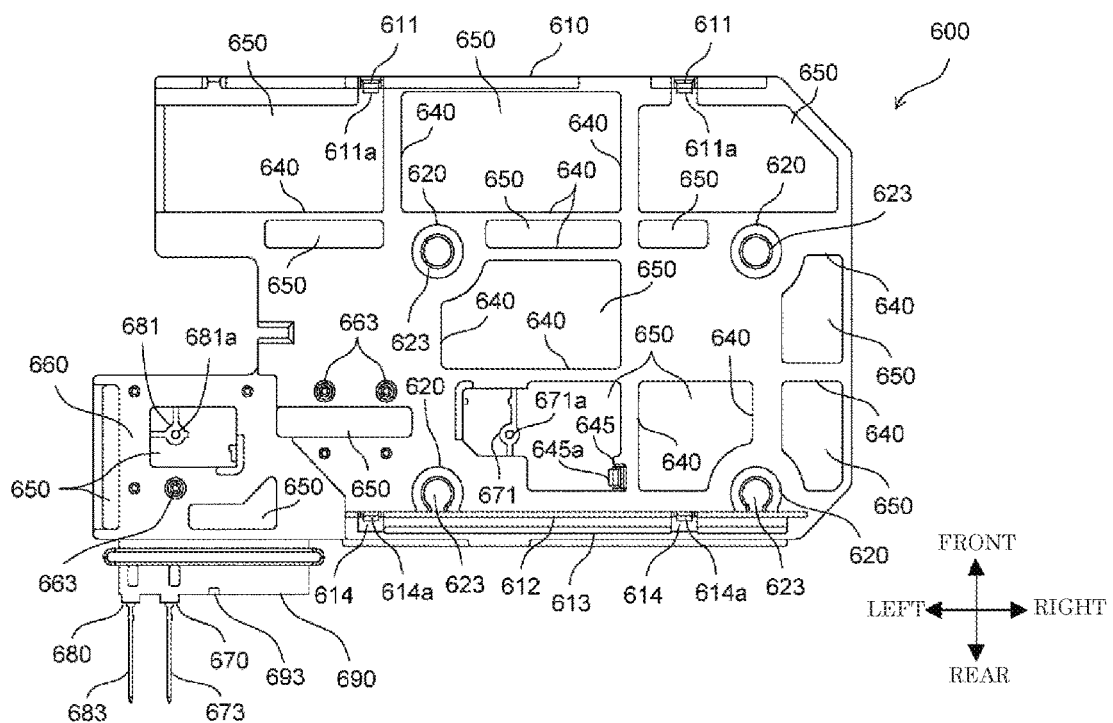
FIG. 6B is a bottom view illustrating the board holder according to the exemplary embodiment.

FIG. 5A is a front perspective view illustrating board holder 600, and FIG. 5B is a rear perspective view illustrating board holder 600. FIG. 6A is a plan view illustrating board holder 600, and FIG. 6B is a bottom view illustrating board holder 600.

Board holder 600 is made of resin such as polyphenylene sulfide (PPS), and includes outer frame 610 that has a shape corresponding to an inner part of case 800. Outer frame 610 includes, at each of two sections of its front side, snap piece 611 and claw 611a formed at a tip end of snap piece 611. Outer frame 610 also includes, at its rear side, inner plate part 612 and outer plate part 613, each of which is long in the left-to-right direction and extends downward. Inner plate part 612 and outer plate part 613 oppose each other in the front-to-rear direction across a space corresponding to a thickness of second main body 310 of second bus bar 300. Inner plate part 612 includes, at each of its two sections, snap piece 614 and claw 614a formed at a tip end of snap piece 614. Outer plate part 613 is lower than inner plate part 612, and a portion opposite each of snap pieces 614 at right side is cut out.

Inside outer frame 610, board holder 600 includes four fixing bosses 620. Four fixing bosses 620 each having a cylindrical shape are arranged with a space from each other, the space equal to a space between four attachment holes 501 of circuit board 500. Each of fixing bosses 620 has an upper end face as mounting face 621, to which circuit board 500 is to be mounted. Each of mounting faces 621 includes screw hole 622, one end of which is closed. Each of screw holes 622 has an inner circumferential face cut with a female screw. Trench 630 is provided around each of fixing bosses 620. Each of trenches 630 includes first wall 631 for surrounding fixing boss 620, and second wall 632 for closing between fixing boss 620 and first wall 631. With regard to each of two of trenches 630 at a rear side, a part of first wall 631 coincides with a part of outer frame 610. At a lower end face of each of fixing bosses 620, large projection 623 of a circular shape is formed.

Crosspieces 640, each having an appropriate shape, are provided in plurality and laid longitudinally and transversely inside outer frame 610. Board holder 600 includes openings 650 provided in plurality and partitioned by crosspieces 640 inside outer frame 610. Some of crosspieces 641 are provided between adjoining two of openings 650 and formed in a T shape in cross section. Two of fixing bosses 620 at left front side and left rear side are connected by rib 642 that is formed on crosspiece 640 between these two of fixing bosses 620. The other two of fixing bosses 620 at right front side and right rear side are connected by rib 643 that is formed on crosspiece 640 between these other two of fixing bosses 620. Each of rib 642 and rib 643 includes, at its center, positioning pin 644. Crosspiece 640 between two of fixing bosses 620 at the left rear side and the right rear side includes, at its bottom face, snap piece 645 and claw 645a formed in snap piece 645.

Board holder 600 includes wiring portion 660 inside outer frame 610. Wiring portion 660 has first signal bus bar 670 and second signal bus bar 680, each formed of a conductive metallic material such as a copper, embedded by insert molding. Board holder 600 also has openings 650 provided in plurality around wiring portion 660.

First signal bus bar 670 includes first connecting part 671, first connection pin 672, first output signal terminal 673, and first conductive wire portion 674. Second signal bus bar 680 includes second connecting part 681, second connection pin 682, second output signal terminal 683, and second conductive wire portion 684. First connecting part 671 and second connecting part 681 respectively include connection holes 671a and 681a, and are respectively exposed in openings 650 adjacent to wiring portions 660. First connection pin 672 and second connection pin 682 respectively project upward in a vicinity of fixing boss 620 and trench 630 at the left rear side. First output signal terminal 673 and second output signal terminal 683, each having a pin shape, project rearward from terminal block 690 provided at rear side of outer frame 610. First connecting part 671, first connection pin 672, and first output signal terminal 673 are connected via first conductive wire portion 674, and second connecting part 681, second connection pin 682 and second output signal terminal 683 are connected via second conductive wire portion 684.

On an upper face of wiring portion 660, first surrounding wall 661 is provided to surround first connection pin 672, and second surrounding wall 662 is provided to surround second connection pin 682. In trench 630 at the left rear side, a part of first wall 631 and outer frame 610 coincides with a part of first surrounding wall 661; and a part of first wall 631 and rib 642 coincides with a part of second surrounding wall 662. Wiring portion 660 also includes, at three sections of its bottom face, three small projections 663 of a circular shape.

Terminal block 690 includes two insertion holes 691 each having a slit shape, arranged at left side and at right side to be aligned with each other. Terminal block 690 also includes, at a center of its rear face, groove 692 and projection 693 formed in groove 692.

Figure 7A:
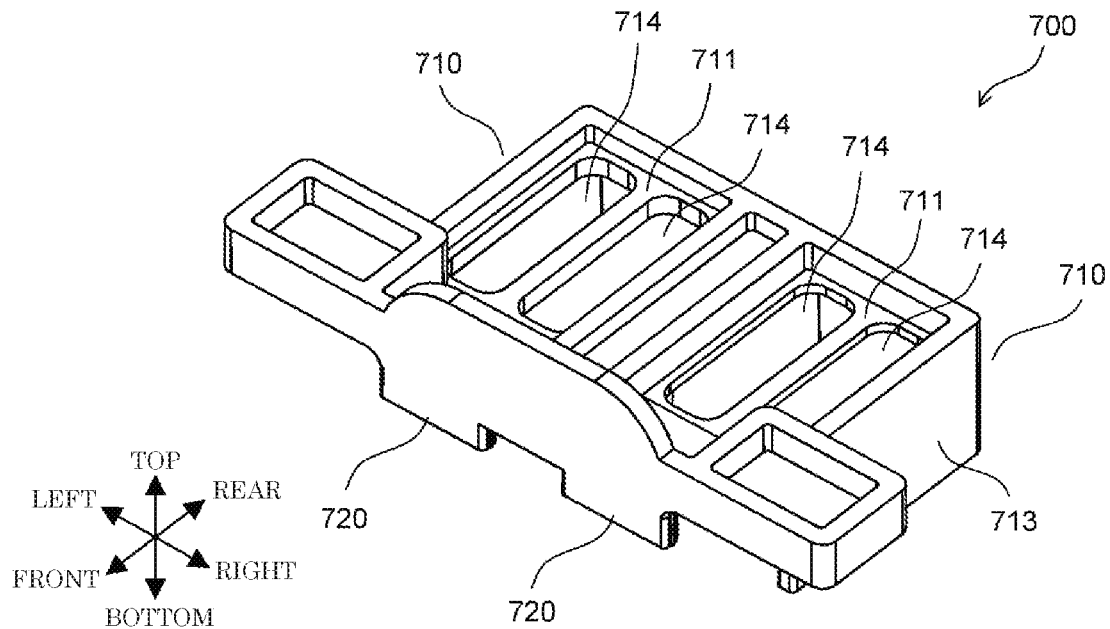
FIG. 7A is an upper front perspective view illustrating a terminal cover according to the exemplary embodiment.
Figure 7B:
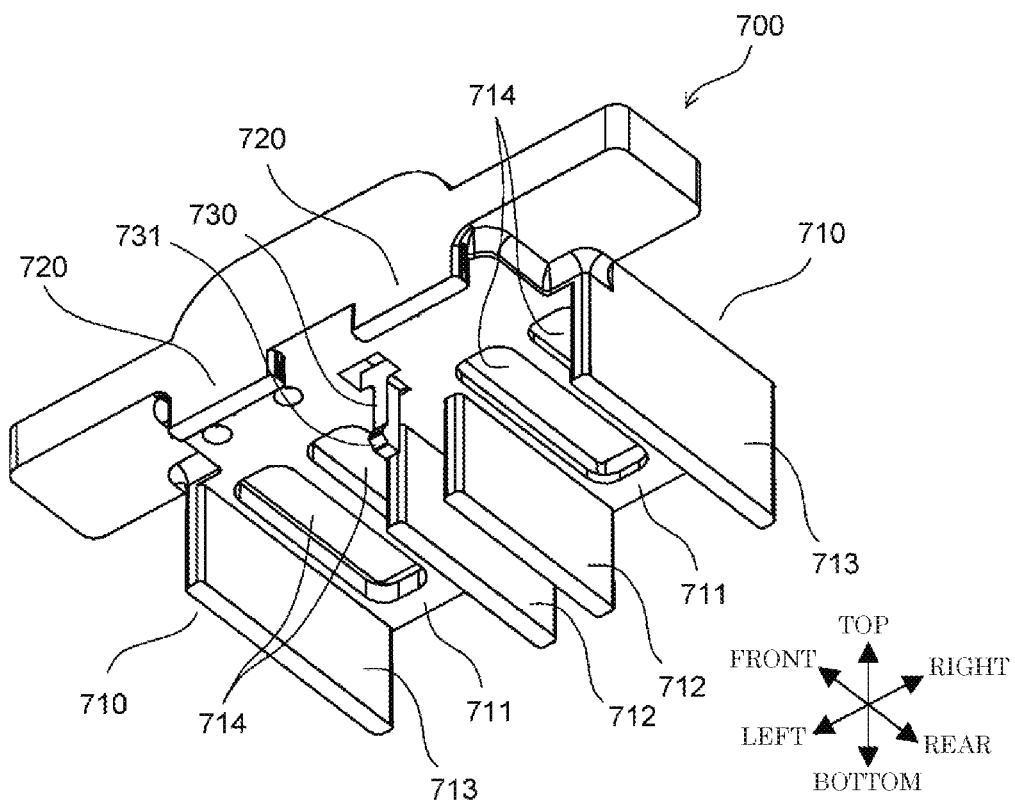
FIG. 7B is a lower front perspective view illustrating the terminal cover according to the exemplary embodiment.

FIG. 7A is an upper front perspective view illustrating terminal cover 700, and FIG. 7B is a lower front perspective view illustrating terminal cover 700.

Terminal cover 700 is made of a resin such as polyphenylene sulfide (PPS), and includes cover portions 710, one at left side and the other at right side of terminal cover 700. Each of cover portions 710 includes top wall 711, inner wall 712, and outer wall 713. Top wall 711 includes two windows 714, each having a substantially rectangular shape. Cover portion 710 at the right side is provided as a spare. Terminal cover 700 also includes two insertion pieces 720, each having a shape corresponding to two insertion holes 691 of terminal block 690. Terminal cover 700 further includes snap piece 730 projecting downward between cover portions 710 at each of the left side and the right side. Snap piece 730 includes, at its tip end, claw 731.

Figure 8A:
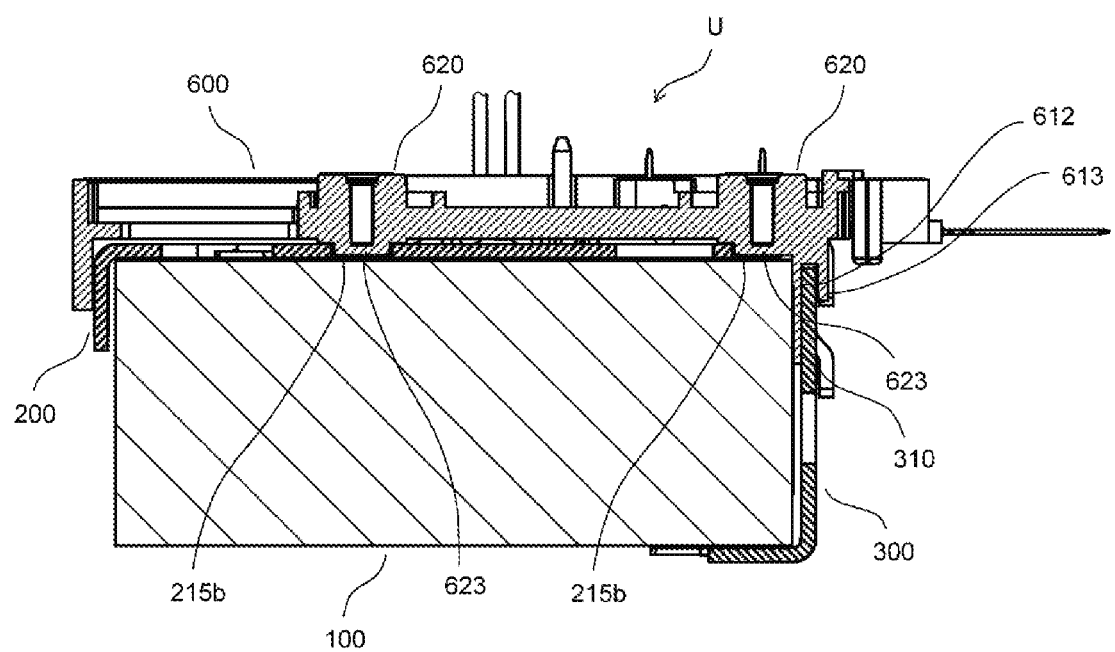
FIG. 8A is a partial sectional side view illustrating the capacitor element unit according to the exemplary embodiment in a state where the board holder has been mounted to the capacitor element unit.
Figure 8B:
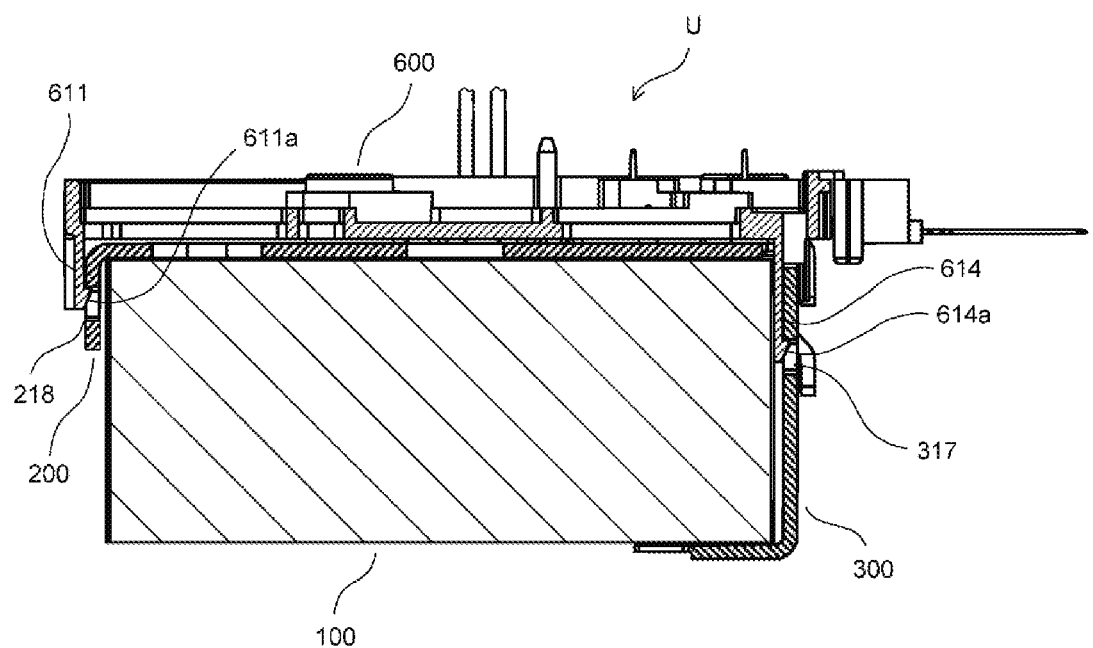
FIG. 8B is a partial sectional side view illustrating the capacitor element unit according to the exemplary embodiment in a state where the board holder has been mounted to the capacitor element unit.
Figure 9:
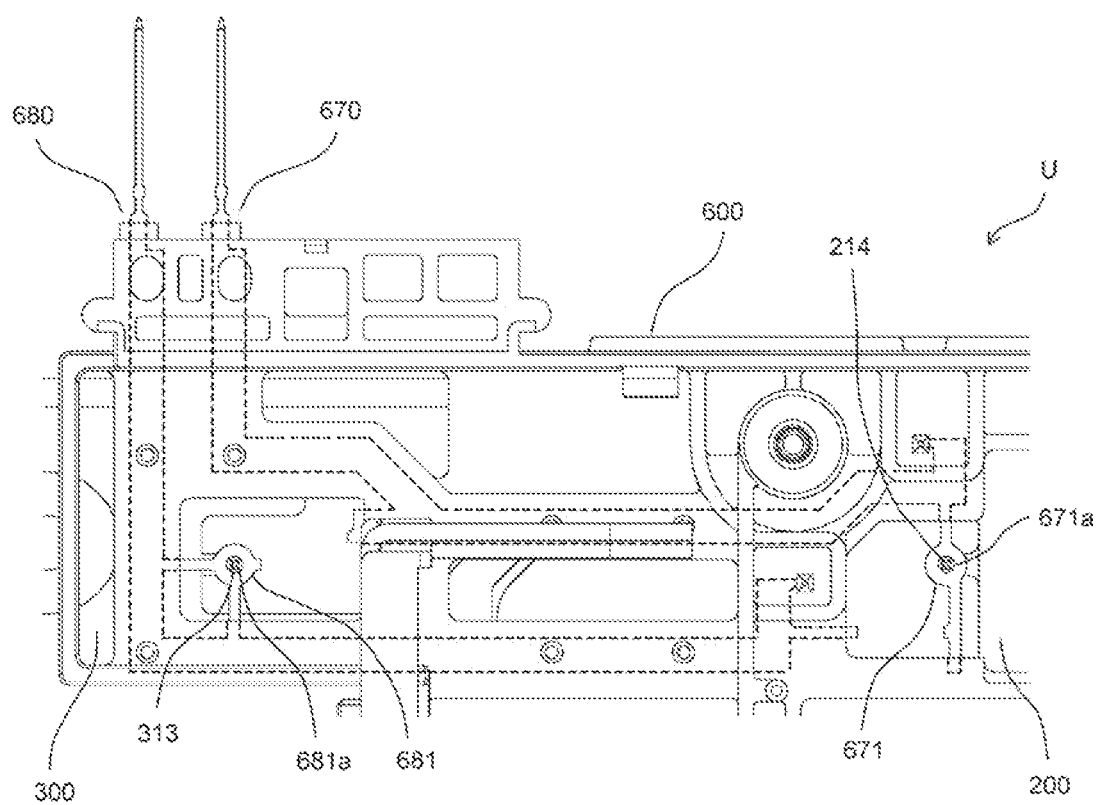
FIG. 9 is a partial enlarged plan view illustrating the capacitor element unit according to the exemplary embodiment in a state where the board holder has been mounted to the capacitor element unit.

Each of FIG. 8A and FIG. 8B is a partial sectional side view illustrating capacitor element unit U, to which board holder 600 has been mounted. FIG. 8A is a sectional view illustrating capacitor element unit U, taken along a line between two of fixing bosses 620 at the left side. FIG. 8B is a sectional view illustrating capacitor element unit U, taken along a line between snap piece 611 and engagement hole 218 at the left side and snap piece 614 and engagement hole 317 at the left side. FIG. 9 is a partial enlarged plan view illustrating capacitor element unit U, to which board holder 600 has been mounted.

Board holder 600 is mounted to capacitor element unit U from above, at a right side region of capacitor element unit U. As illustrated in FIG. 8A, each of four large projections 623 of board holder 600 is fitted into a corresponding one of four large fitting holes 215b of first bus bar 200. Similarly, three small projections 663 of board holder 600 are respectively fitted into two small fitting holes 215a of first bus bar 200 and small fitting hole 314 of second bus bar 300. Concurrently, board holder 600 has second main body 310 of second bus bar 300 interposed between inner plate part 612 and outer plate part 613. Further, as illustrated in FIG. 8B, board holder 600 has claws 611a of snap pieces 611 at two sections of the front side engaged with two engagement holes 218 of first bus bar 200. Concurrently, board holder 600 has claws 614a of snap pieces 614 at two sections of the rear side engaged with two engagement holes 317 of second bus bar 300. Similarly, board holder 600 has claw 645a of snap piece 645 engaged with engagement hole 217 of first bus bar 200. With this configuration, board holder 600 is fixed to capacitor element unit U in the front-to-rear, the left-to-right, and the top-to-bottom directions.

As illustrated in FIG. 9, first connection pin 214 of first bus bar 200 is fitted into connection hole 671a of first connecting part 671 of first signal bus bar 670 in board holder 600. Here, first connection pin 214 is joined to first connecting part 671 by soldering. Similarly, second connection pin 313 of second bus bar 300 is fitted into connection hole 681a of second connecting part 681 of second signal bus bar 680 in board holder 600. Here, second connection pin 313 is joined to second connecting part 681 by soldering.

As illustrated in FIG. 1B, capacitor element unit U, to which board holder 600 has been mounted, is housed in case 800.

Case 800 is made of resin, for example, polyphenylene sulfide (PPS). Case 800 is formed in a substantially rectangular parallelepiped box shape, and an upper face of case 800 has an opening. Case 800 includes attachment tab 810 at an upper part of an outer wall at each of left side face and right side face of case 800. Each attachment tab 810 includes through hole 811. Collar 812 made of metal is fitted into through hole 811 to increase strength of the hole. Each attachment tab 810 includes positioning projection 813 projecting rearward. When film capacitor 1 is installed in an installation part of an external device, each attachment tab 810 is fixed to the installation part by bolts or the like.

When capacitor element unit U has been housed in case 800, case 800 is filled with filling resin 900. Filling resin 900 is a thermosetting resin, for example, an epoxy resin, and filling resin 900 in a molten state is injected in case 800. In this state, openings 650 provided in plurality in board holder 600 penetrate between the opening of case 800 and capacitor elements 100, so that filling resin 900 injected in the molten state flows through openings 650. Filling resin 900 in the molten state further flows through flow holes 216a and flow holes 216b of first bus bar 200, and flows through flow holes 315, flow holes 316a, and flow holes 316b of second bus bar 300. As a result, case 800 is smoothly filled with filling resin 900. Then, case 800 is heated and filling resin 900 is hardened in case 800. Parts of capacitor element unit U embedded in filling resin 900 are protected from moisture or shock by case 800 and filling resin 900.

Figure 10A:
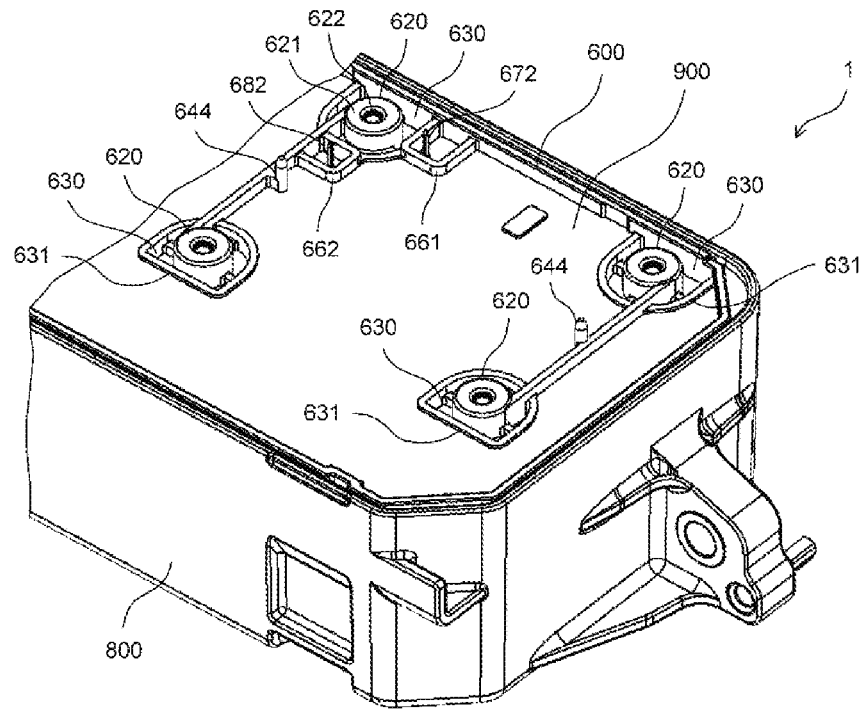
FIG. 10A is a partial enlarged perspective view illustrating the film capacitor according to the exemplary embodiment, when the case has been filled with a filling resin and before the circuit board is mounted to the board holder.
Figure 10B:
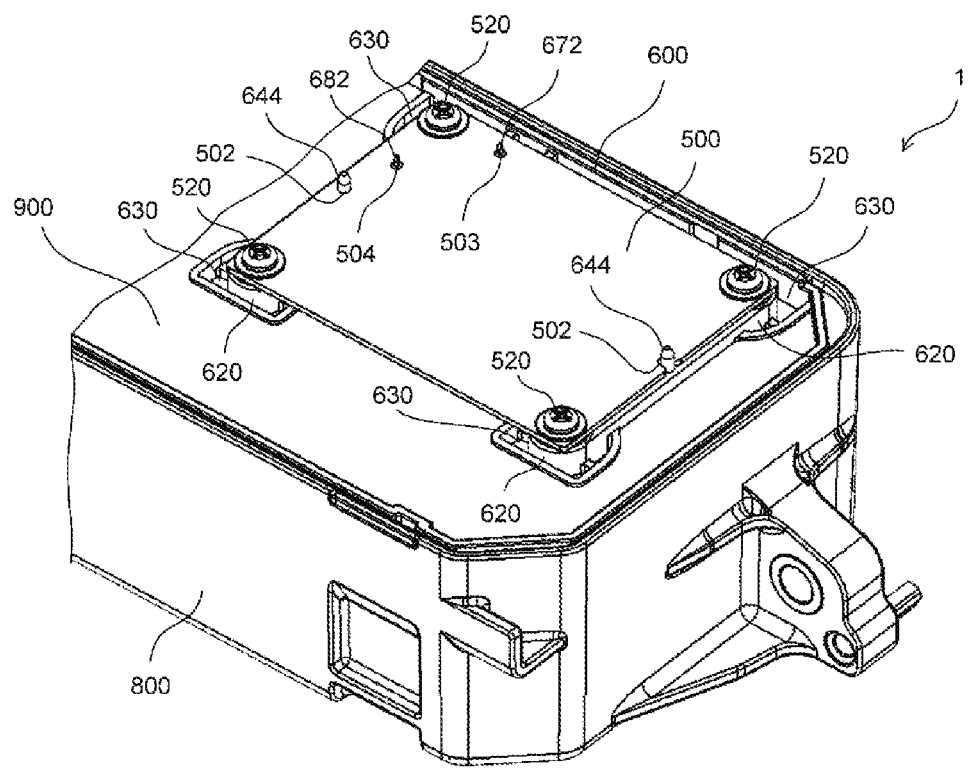
FIG. 10B is a partial enlarged perspective view illustrating the film capacitor according to the exemplary embodiment, when the circuit board has been mounted to the board holder.

FIG. 10A is a partial enlarged perspective view illustrating film capacitor 1 when case 800 has been filled with filling resin 900 and before circuit board 500 is mounted to board holder 600. FIG. 10B is a partial enlarged perspective view illustrating film capacitor 1 when circuit board 500 has been mounted to board holder 600.

As illustrated in FIG. 10A, case 800 is filled with filling resin 900 to a position slightly lower than an upper end face of first wall 631 in each of four trenches 630 of board holder 600. First wall 631 is positioned higher than a surface of filling resin 900, and thus, a region surrounding each of fixing bosses 620, i.e., each of trenches 630, is not filled with filling resin 900. Concurrently, each of first surrounding wall 661 and second surrounding wall 662 is positioned higher than the surface of the filling resin 900, and thus, a region surrounding each of first connection pin 672 and second connection pin 682 is not filled with filling resin 900. Most part of board holder 600 is embedded in filling resin 900, but four fixing bosses 620 (mounting faces 621), first connection pin 672, second connection pin 682, and positioning pins 644 are exposed from filling resin 900.

As illustrated in FIG. 10B, circuit board 500 has been mounted to board holder 600 and is held exposed from filling resin 900. In this state, board holder 600 has each of positioning pins 644 inserted into a corresponding one of positioning holes 502 of circuit board 500, so that circuit board 500 is positioned in board holder 600. Each of four attachment holes 501 of circuit board 500 matches a corresponding one of screw holes 622 of fixing bosses 620. Each of screws 520 is passed through a corresponding one of attachment holes 501 and fixed in a corresponding one of screw holes 622. With this configuration, circuit board 500 is screwed to be fixed to board holder 600. First connection pin 672 is passed through and soldered to first through hole 503, and second connection pin 682 is passed through and soldered to second through hole 504. With this configuration, first bus bar 200 is electrically connected to discharge circuit 510 of circuit board 500 via first signal bus bar 670, and second bus bar 300 is electrically connected to discharge circuit 510 of circuit board 500 via second signal bus bar 680.

Figure 11A:
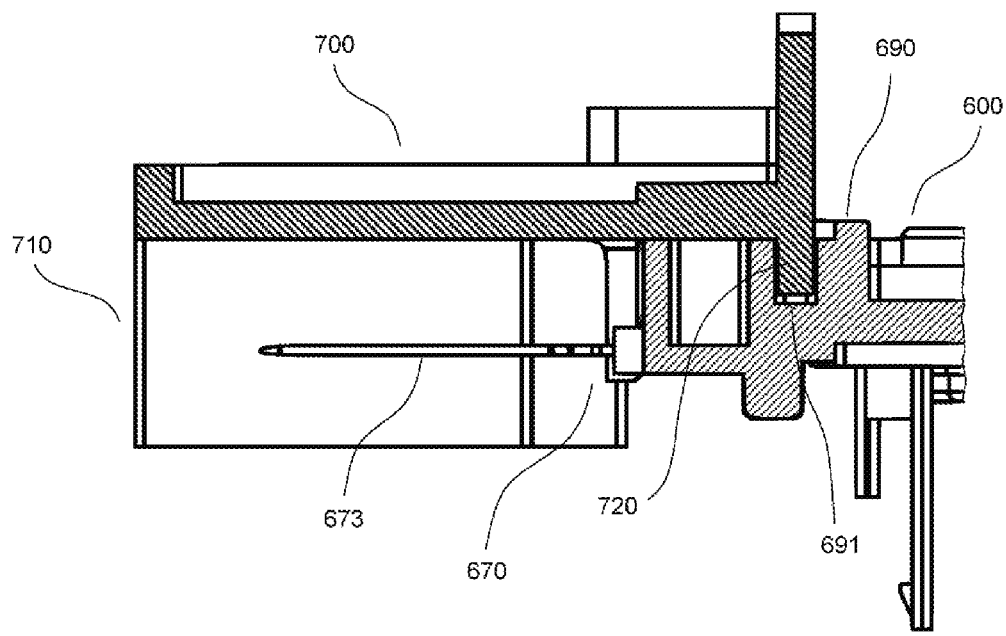
FIG. 11A is a partial enlarged sectional view illustrating the board holder according to the exemplary embodiment in a state where the terminal cover has been mounted to a terminal block.
Figure 11B:
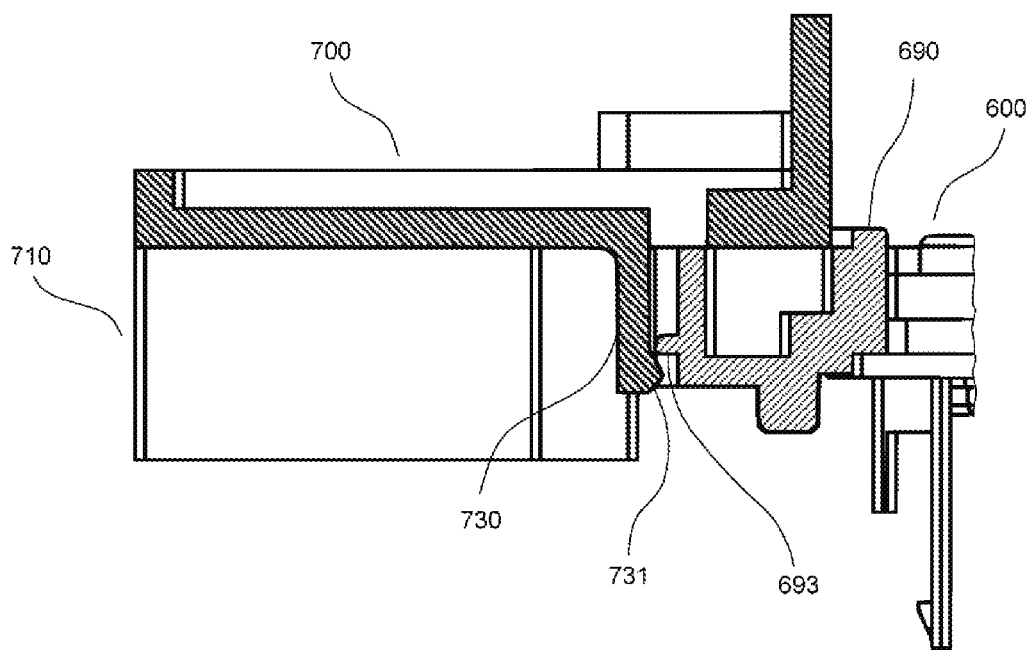
FIG. 11B is a partial enlarged sectional view illustrating the board holder according to the exemplary embodiment in a state where the terminal cover has been mounted to the terminal block.

Each of FIGS. 11A and 11B is a partial enlarged sectional view illustrating board holder 600 in a state where terminal cover 700 has been mounted to terminal block 690. FIG. 11A is a sectional view illustrating board holder 600, taken along a plane perpendicular to insertion hole 691 at the left side. FIG. 11B is a sectional view illustrating board holder 600, taken along a plane perpendicular to groove 692.

When circuit board 500 has been mounted to board holder 600, terminal cover 700 is mounted to terminal block 690 of board holder 600. In this state, as illustrated in FIG. 11A, each of two insertion pieces 720 in terminal cover 700 is inserted into a corresponding one of two insertion holes 691 of terminal block 690. Further, as illustrated in FIG. 11B, claw 731 of snap piece 730 in terminal cover 700 engages with projection 693 of terminal block 690. First output signal terminal 673 and second output signal terminal 683, each projecting rearward from terminal block 690, are covered by cover portion 710 at the left side of terminal cover 700. Cover portion 710 includes windows 714, and first output signal terminal 673 and second output signal terminal 683 are viewed from above through windows 714.

Film capacitor 1 is thus completed.

When film capacitor 1 has been mounted to an external device, each of first connection terminal group 230 and first connection terminal 240 of first bus bar 200 is connected to a corresponding one of external terminals in the external device, and each of second connection terminal group 330 and second connection terminal 340 of second bus bar 300 is connected to a corresponding one of the external terminals in the external device. Further, each of first output signal terminal 673 of first signal bus bar 670 and second output signal terminal 683 of second signal bus bar 680 is connected to a corresponding one of voltage signal input terminals in the external device. Note that, when the voltage signal input terminals are respectively connected to first output signal terminal 673 and second output signal terminal 683, terminal cover 700 is to be removed from terminal block 690.

When film capacitor 1 is powered on, a voltage of each of capacitor elements 100 is outputted as a voltage signal from first output signal terminal 673 and second output signal terminal 683 to the external device. With this configuration, the external device detects a voltage anomaly in each of capacitor elements 100.

When film capacitor 1 is powered off, each of five capacitor elements 100 may have a residual electrical charge. The residual electrical charge is inputted to discharge circuit 510 of circuit board 500 via first signal bus bar 670 and second signal bus bar 680, so as to be discharged by discharge circuit 510. This configuration prevents the residual electrical charge on capacitor elements 100.

Effects of Exemplary Embodiment

As has been described above, this exemplary embodiment exerts effects as follows.

Film capacitor 1 includes board holder 600. Board holder 600 includes fixing bosses 620, each configured to fix circuit board 500 to board holder 600. Circuit board 500 has discharge circuit 510 mounted thereon, and is held exposed from filling resin 900 with which case 800 is filled. With this configuration, circuit board 500 is fixed to fixing bosses 620 to be exposed from filling resin 900, and when heat is generated in components (e.g., discharge resistors) of discharge circuit 510, the heat is preferably dissipated from circuit board 500.

Each of fixing bosses 620 has mounting face 621 to which circuit board 500 is to be mounted. Board holder 600 is embedded in filling resin 900 such that at least each of mounting faces 621 is exposed from filling resin 900. With this configuration, filling resin 900 is used to fix board holder 600 firmly in case 800.

Each of fixing bosses 620 includes mounting face 621 and screw hole 622 in mounting face 621. Circuit board 500 is screwed in screw hole 622 to be fixed to mounting face 621. In board holder 600, each of trenches 630 is provided around a corresponding one of fixing bosses 620, and includes first wall 631 surrounding the corresponding one of fixing bosses 620 and second wall 632 closing between the corresponding one of fixing bosses 620 and first wall 631. With this configuration, circuit board 500 is screwed to be firmly fixed to fixing bosses 620. Further, due to trench 630, the area around each of fixing bosses 620 is not filled with filling resin 900. Thus, it is possible to prevent filling resin 900 around fixing bosses 620 from climbing up to mounting faces 621 to be included in screw holes 622. When filling resin 900 is included in screw holes 622, circuit board 500 is not properly screwed in screw holes 622, which is prevented in this case.

Board holder 600 is disposed at a position closer to the opening of case 800 with respect to capacitor elements 100. Board holder 600 includes openings 650 that penetrate between the opening of case 800 and capacitor elements 100. With this configuration, filling resin 900 in the molten state is injected in case 800 and flows through openings 650 to reach capacitor elements 100, and case 800 is smoothly filled with filling resin 900.

Board holder 600 includes openings 650 provided in plurality, and between the adjoining two of openings 650, crosspieces 641 of the T shape in cross section are formed. With this configuration, board holder 600 is more rigid and less likely to be deformed.

Each of capacitor elements 100 has, at its one end face, first end-face electrode 110 to which first bus bar 200 is connected, and at its other end face, second end-face electrode 120 to which second bus bar 300 is connected. Board holder 600 includes first signal bus bar 670 configured to electrically connect first bus bar 200 to discharge circuit 510, and second signal bus bar 680 configured to electrically connect second bus bar 300 to discharge circuit 510. With this configuration, when circuit board 500 is mounted to board holder 600, each of first bus bar 200 and second bus bar 300 is electrically connected to discharge circuit 510. Concurrently, first signal bus bar 670 includes first output signal terminal 673 and second signal bus bar 680 includes second output signal terminal 683, so that the voltage of each of capacitor elements 100 is outputted as the voltage signal to the external device.

Further, film capacitor 1 includes circuit board 500 fixed to fixing bosses 620 of board holder 600. With this configuration, film capacitor 1 includes circuit board 500 to which discharge circuit 510 is mounted, and thus, the external device may not include circuit board 500.

The exemplary embodiment of the present disclosure has been described above. Meanwhile, the present disclosure is not limited to the foregoing exemplary embodiment, and application examples of the present disclosure may include various modifications in addition to the foregoing exemplary embodiment.

For example, in the foregoing exemplary embodiment, film capacitor 1 includes circuit board 500. Meanwhile, film capacitor 1 may not include circuit board 500. Circuit board 500 may be prepared in the external terminal, so that when film capacitor 1 is mounted to the external device, circuit board 500 is to be mounted to board holder 600.

In the foregoing exemplary embodiment, discharge circuit 510 is mounted on circuit board 500. Meanwhile, other electronic circuits instead of discharge circuit 510 may be mounted on circuit board 500 as long as the electronic circuits are related to capacitor elements 100.

In the foregoing exemplary embodiment, board holder 600 includes fixing bosses 620, each including screw hole 622, and circuit board 500 is screwed to be fixed in fixing bosses 620. Meanwhile, board holder 600 may include a fixing part that has other fixing structures. For example, board holder 600 may include a fixing part provided with a snap piece, and circuit board 500 may include an engagement hole, so that the snap piece engages with the engagement hole to fix circuit board 500 to the fixing part (i.e., snap fit structure). In this case, trench 630 may not be provided around the fixing part.

In the foregoing exemplary embodiment, capacitor element unit U includes five capacitor elements 100. Meanwhile, the number of capacitor elements 100 may be appropriately modified, such as only one.

In the foregoing exemplary embodiment, each of capacitor elements 100 is formed of the metalized films, in each of which aluminum is deposited on the dielectric film, but alternatively may be formed of metalized films, in each of which other metal such as zinc and magnesium is deposited on the dielectric film. Still alternatively, each of capacitor elements 100 may be formed of metalized films in each of which two or more of these metals are deposited on the dielectric film. Still more alternatively, each of capacitor elements 100 may be formed of metalized films in each of which an alloy of these metals is deposited on the dielectric film. Further, in the foregoing exemplary embodiment, each of capacitor elements 100 is formed by stacking the two metalized films in each of which aluminum is deposited on the dielectric film, and winding or laminating the two metalized films stacked. Alternatively, each of capacitor elements 100 may be formed by stacking an insulating film and a metalized film that includes a dielectric film and aluminum deposited on both sides of the dielectric film, and winding or laminating the insulating film and the metalized film stacked each other.

In the foregoing exemplary embodiment, film capacitor 1 is used as an example of a capacitor of the present disclosure. Meanwhile, the present disclosure may be applied to other capacitors in addition to film capacitor 1.

Additionally, various modifications may be appropriately made to the exemplary embodiment of the present disclosure within the scope of the technical concept disclosed in the appended claims of the present disclosure.

It should be noted that, in the description of the foregoing exemplary embodiment, a term indicating each direction, such as "upward" or "downward", indicates a relative direction that only depends on a relative positional relationship of constituent members, and thus does not indicate an absolute direction, such as a vertical direction or a horizontal direction.

The present disclosure is usable for capacitors to be used in various types of electronic devices, electrical devices, industrial equipment, electric components for vehicles, and the like.

What is claimed is:

1. A capacitor comprising:
   a capacitor element;
   a case housing the capacitor element;
   a filling resin filled in the case; and
   a board holder including a fixing part to which a circuit board mounted with an electronic circuit is to be fixed, the board holder being configured to hold the circuit board to be exposed from the filling resin, wherein:
   the fixing part includes a mounting face to which the circuit board is to be mounted,
   the board holder is embedded in the filling resin so that at least the mounting face is exposed from the filling resin,
   the fixing part includes a screw hole for fixing the circuit board to the mounting face, and
   the board holder includes a trench surrounding the fixing part, the trench being defined by a first wall disposed around the fixing part and a second wall closing a space between the fixing part and the first wall.

2. The capacitor according to claim 1, wherein:
   the board holder is closer to an opening of the case than the capacitor element is, and
   the board holder includes an opening that penetrates between a surface close to the opening of the case and a surface close to the capacitor element.

3. The capacitor according to claim 2, wherein the board holder includes:
   a plurality of openings each being the opening of the board holder; and
   a crosspiece disposed between an adjoining two of the plurality of openings, the crosspiece having a T shape in cross section.

4. The capacitor according to claim 1, further comprising a bus bar connected to an electrode disposed on each of both end faces of the capacitor element,
   wherein the board holder includes an electrical wiring electrically connecting the bus bar to the electronic circuit.

5. The capacitor according to claim 1, further comprising the circuit board fixed to the fixing part of the board holder.

6. A capacitor comprising:
   a capacitor element;
   a case housing the capacitor element;
   a filling resin filled in the case; and
   a board holder including a fixing part to which a circuit board mounted with an electronic circuit is to be fixed, the board holder being configured to hold the circuit board to be exposed from the filling resin, wherein:
   the fixing part includes a mounting face to which the circuit board is to be mounted,
   the board holder is embedded in the filling resin so that at least the mounting face is exposed from the filling resin, the board holder is closer to an opening of the case than the capacitor element is, the board holder includes an opening that penetrates between a surface close to the opening of the case and a surface close to the capacitor element, and the board holder includes:

a plurality of openings each being the opening of the board holder; and a crosspiece disposed between an adjoining two of the plurality of openings, the crosspiece having a T shape in cross section.

7. The capacitor according to claim 6, further comprising a bus bar connected to an electrode disposed on each of both end faces of the capacitor element, wherein the board holder includes an electrical wiring electrically connecting the bus bar to the electronic circuit.

8. The capacitor according to claim 6, further comprising the circuit board fixed to the fixing part of the board holder.

\* \* \* \* \*